United States Patent [19]
Rosshirt

[11] 3,904,858
[45] Sept. 9, 1975

[54] ABSOLUTE NUMERICAL CONTROL SYSTEM
[75] Inventor: Hermann Rosshirt, Bristol, Conn.
[73] Assignee: The Superior Electric Company, Bristol, Conn.
[22] Filed: Feb. 21, 1974
[21] Appl. No.: 444,695

[52] U.S. Cl. ........... 235/151.11; 235/152; 318/696; 318/573; 340/172.5
[51] Int. Cl. ....................... H02p 5/46; G05b 19/18
[58] Field of Search ....... 235/151.11, 152; 318/573, 318/574, 696; 340/172.5

[56] References Cited
UNITED STATES PATENTS
3,247,365 4/1966 Dell et al. ........................ 235/152
3,278,817 10/1966 Johnson et al. ................. 318/573 X

*Primary Examiner*—Eugene G. Botz
*Attorney, Agent, or Firm*—Ernest M. Junkins

[57] ABSTRACT

A numerical control system that accepts information for movement to a new position from a present position in absolute form and transforms it into incremental movement data for use by an incremental numerical control system by comparing the information in a new position register that is set to the new position information with the information in the present position register that is set to the present absolute position, supplying the difference to the incremental numerical control system as the incremental movement and then transferring the new position register information to the present position register for use with the next new position information.

6 Claims, 1 Drawing Figure

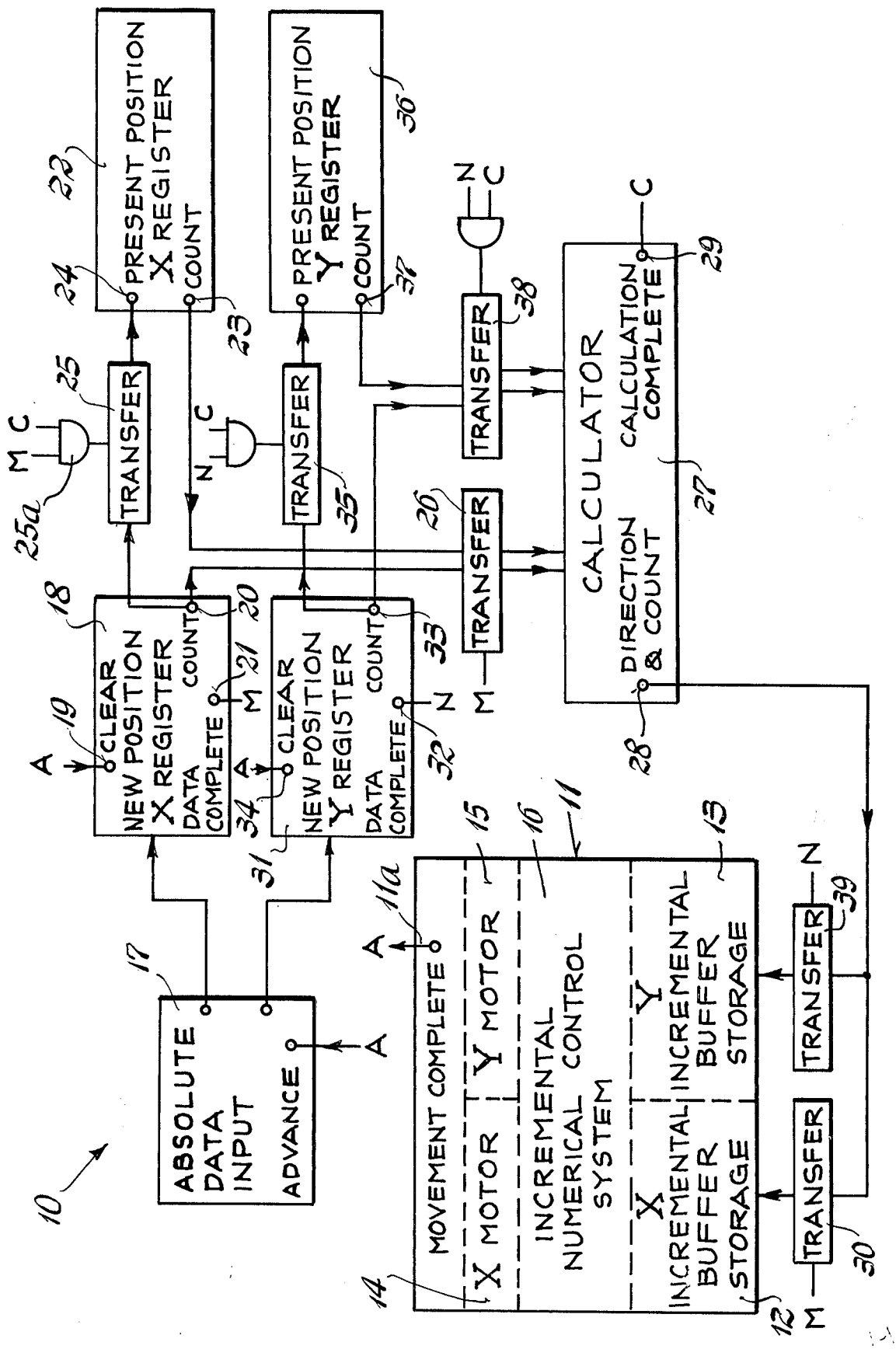

ABSOLUTE NUMERICAL CONTROL SYSTEM

In U.S. Pat. Nos. 3,466,517 and 3,582,751 granted Sept. 9, 1969 and June 1, 1971 respectively and assigned to the assignee of the present invention, there are disclosed numerical control systems that accept input information to successively position a part by controlling movement of a motor. Input information is in absolute form denoting each commanded position by its distance from a "home" or one selected location. Both systems transform each absolute command into the incremental distance from the present position of the motor or part to the next commanded position with the incremental distance being expressed as a number representing equal lengths of incremental movement.

In these two systems, a pulse is provided to a stepping motor for each increment and every pulse effects a change of energization of the stepping motor which produces a rotational step that may be used directly or converted into an incremental motion of a part. The location of the part is continuously maintained by a count in a present position counter of the number of increments of movement from the home position for each motor. By comparing the count of the present position counter with the absolute input information of the next position, also expressed as a count, the extent and direction of the required incremental movement is obtained by being the difference therebetween.

For maintaining the count of the present position, it has heretofore been suggested that each pulse be counted as it produces a motor movement. In the two above-noted systems at least half of the pulses are counted as they occur with the remainder being counted other than simultaneously with motor movement. But in any event the heretofore known systems have altered the count of the present position by individually counting each pulse which requires that the system complete the processing of a present command and position the motor at this commanded position before it is capable of receiving the next commanded position and processing same.

While such systems have been found satisfactory, they have tended to limit the speed in which the system can transform information into movement as further information of a subsequent command could not be processed until after the motor movement for the prior command was complete. Moreover, these systems were relatively expensive as each motor required its own independent system for determining its incremental movement and did not have parts which could be shared with another motor system.

It is accordingly an object of the present invention to provide a numerical control system in which the input information in absolute form is converted into incremental information more rapidly than in heretofore known systems and in which the conversion is independent of the motor movement and not required to be simultaneous or subsequent to completion of a motor movement.

Another object of the present invention is to provide an absolute numerical control system by adding only a few parts to an incremental numerical control system and in which the additional parts do not require any substantial alteration of the incremental control system.

A further object of the present invention is to achieve the above objects with an absolute numerical control system that is relatively economical to manufacture by making portions of the system usable with more than one motor or with more than one piece of information in a command.

In carrying out the present invention one type of incremental numerical control system with which it is employed, is shown in U.S. Pat. No. 3,525,917 granted Aug. 25, 1970 and assigned to the assignee of the present invention. This system accepts input information in incremental form as a number and direction for the X axis and the Y axis. Preferably as shown, the system is performing one command while the information for the next command may be stored in the two buffer storage registers. The system upon completion of a movement transfers the incremental data stored in the storage registers into the various operational registers for processing and after the transfer of the information, the storage registers will accept information for the next commanded movement.

The present invention provides for each piece of information of movement, i.e., X axis and Y axis, a new position register and a present register so that there may be two pairs of registers for two axes, three pair for three axes, etc. The input information in absolute form for each command has each new position register set to this input information while the present position registers maintain information of the present position of the system with respect to the home position. By algebraically adding the counts of the new position registers with the count of the present position registers through the use of an algebraic sum calculator which algebraically adds the counts, the differences are determined and transferred into the storage register of the incremental numerical control system, the abolute input information is thus converted into incremental input data usable by the system.

Upon the processing of the incremental data by the incremental system, a signal is given to provide the next absolute command information to the new position registers for subsequent processing. However, prior to receiving said next command information, the position or information in the new position registers is caused to be transferred to their present position registers so that the present position registers now contain the information of the "new" absolute position for use in determining an incremental movement for the next new command information. Thus, the present system operates independently of the motor movement and does not count pulses. Further the present position registers may be shifted to a count indicative of the present position for use with the next command at any time after they have processed, through the calculator and stored, the incremental data in the incremental system of the prior command.

A further feature of the present invention resides in causing the calculator that produces the incremental data to be time shared among the registers when the command includes more than one piece of information. Thus only one calculator is needed and as the time required for the calculator to process the information in each pair of registers to produce the incremental data is quite short, the time sharing of the calculator between pairs of registers does not decrease the rapidity of operation of the system in carrying out commands.

Other features and advantages will hereinafter appear.

In the drawing:

The sole FIGURE is a block diagram of the absolute numerical control system of the present invention.

Referring to the drawing, the absolute numerical control system is generally indicated by the reference numeral 10 and includes an incremental numerical control system indicated by the reference numeral 11. The system 11 is shown in block form as a two axes positioning system and includes a buffer storage 12 for the X axis and a buffer storage 13 for the Y axis. In addition, an X axis motor is indicated as at 14 and a Y axis motor by the reference numeral 15. The system includes an operating portion 16 that accepts the information of incremental movements in the buffer storages 12 and 13 and transforms it into changes of energization of the motors to produce the commanded movement. Upon completion of a movement, a movement complete signal is produced on a lead 11a from the system and indicated by the reference character A. The presence of a movement complete command also causes, as disclosed in the above-noted U.S. Pat. No. 3,525,917, the shifting of the next command information stored in the incremental buffer storages 12 and 13 into the operating portion 16 to effect the next movement of the motors 14 and 15.

The movement complete signal A is also directed to an absolute data input 17 having an advance terminal which upon receipt of the signal A causes the data input 17 to provide information of the next movement which, in the embodiment shown would cause X axis information to be first provided and then Y axis information. The data input 17 may be a device which produces the command information in a manner which is compatible with the system 10 and thus may be a punched type reader if the information is stored on punched tape, manually set switches, etc. Connected to receive the information from the data input 17 is a new position X register 18 that has a clear terminal 19 connected to receive the signal A. The information to which the register 18 is set, namely a numerical count, is obtained from a count terminal 20, while a data complete terminal 21 is provided to produce a signal M upon receiving from the data input 17 knowledge that all the X axis information has been sent to the X register 18.

The system 10 also includes for X axis information, a present position X register 22 which is similar to the register 18 and thus has a count terminal 23 at which its information may be outputted and an input terminal 24. This terminal 24 is connected by a transfer switch 25 to the count terminal 20 of the new position X register 18.

The count of the register 18 and the count of the register 22 are both directed to a transfer switch 26 and then to a calculator 27 with the latter having a direction and count terminal 28 and a calculation complete terminal 29, the latter producing a signal C. The calculator determines by subtracting the information of the new position in absolute form stored as a count (or number) in the register 18 with the present position of the system stored in the register 22, also as a count or number, to produce at the terminal 28, a number indicative of this difference between the two numbers and also the direction of the counts, i.e., whether or not the new position register's count is greater or lesser than the count of the present position register. The terminal 28 is connected through a transfer switch 30 to the X axis incremental counter storage 12 so that the incremental data determined by the calculator can be stored in the buffer storage of the numerical control system 11 for subsequent processing.

The calculator after completing the providing of the incremental data to the storage 12, produces on its terminal 29, a signal C which together with the signal M from the data complete terminal of the new position register 18 is directed to an AND gate 25a to actuate the transfer switch 25. Upon actuation, the present position X register 22 has its input connected to the count terminal of the new position register 18 and is made to assume the count of information of the new position X register 18. Thus, the number in the register 18 is shifted to the register 22. Upon a movement being complete, the signal A appears to clear the new position X register 18 through its clear terminal 19 so that the register will be in condition to receive the information of the next new position from the absolute data input 17 that also becomes actuated by the signal A.

The information from the data input 17 includes a signal that indicates that all the data destined for the new position X register has been supplied and this signal appears on the lead 21 as a signal M from the register 18. The M signal is utilized to actuate the transfer switch 26 to assure that the count of the register 18 will not be transferred to the calculator 27 until it has received all of its information. Thus, only after completion of receipt of the information can the calculator arithmetically process the information in the two registers 18 and 22 and then through the transfer switch 30, which also is controlled by the signal M, transfer the incremental number from the terminal 28 to the X incremental buffer storage 12.

While it is possible to provide a calculator 27 for each motor, or piece of information in a command, it has been found economical and desirable without decreasing the rapidity of operation of the system to time share the calculator with other pieces or pairs of registers. Thus, as shown, there is a new position register 31 for the Y axis having a data complete terminal 32, a count terminal 33 and a clear terminal 34 connected to receive the signal A. The count terminal 33 is connected through a transfer switch 35 to a present position Y register 36 having a count terminal 37. The two count terminals 33 and 37 are connected by a transfer switch 38 to the calculator 27 and also the output lead 28 of the calculator is connected by a transfer switch 39 to the Y incremental buffer storage 13. The registers 31 and 18 are identical as are the registers 36 and 22 though the former only provides a data complete signal at its terminal 32 and indicated by the reference character N when it receives knowledge that the register 31 has received all the Y information. The transfer switch 38 is actuated only when both the data complete signal N and the signal C from the calculation complete terminal of the calculator 27 appear while the transfer switch 39 is only actuated when the signal N is present.

With this structure for time sharing the calculator 27, initially the absolute information for the new position for the X axis is introduced into the register 18 and upon completion, is supplied, with the register 22 information, to the calculator by the transfer switch 26. The incremental information from the calculator 27 is transferred by operation of switch 30 only to the X counter storage 12. Upon completion of the arithmetic, the signal C together with the still present signal M actuates the transfer switch 25 to transfer the information in the X register 18 to the register 22. During the arithmetic operation, the absolute information for the Y axis command is received by the Y register 31 and upon it receiving from the data input 17, the knowledge that the data is complete, the signal N appears. The N signal which together with the existing signal C serves to actuate the transfer switch 38 to cause the calculator 27 to process the information in the Y registers 31 and 36 and to transmit the same through the transfer switch 38 only to the Y incremental buffer storage 13. Upon the calculator completing this calculation, the transfer switch 35 becomes actuated with the Y register 31 information being shifted to the register 36. When the motor movement is completed, the signal A appears, clearing the X register 18 and the Y register 31 and actuating the data input 17 to have the next position information be received by the two registers 18 and 31.

It will be appreciated that the signals M and N are mutually exclusive in that both cannot appear at the same time. Normally the signal M remains until the signal N appears with the transfer of data into the Y register usually requiring more time than the calculator 27 requires to calculate the X axis incremental data and transfer it to the storage 12. Though, if desired, a mutually exclusive circuit which may be time controlled may be used.

The registers 22 and 36 preferably receive through their respective transfer switches by parallel input, the count of their associated new position registers while normally the input data is serially inputted into the registers 18 and 31. The information to the calculator 27 again is also parallel with the calculator acting serially on the information on a digit by digit basis.

Thus the transfer and the calculations are processed extremely rapidly and though the herein disclosed embodiment shows for each new movement, merely the processing of X axis data and Y axis data it will be clear that, if desired, by adding a pair of registers and appropriate transfer switches for each other piece of information required for each movement that such other data required to effectuate a command may also be processed from absolute to incremental.

Though the term "present position" is utilized herein, this term is employed to indicate the position just prior to the new command position and not the instantaneous position of the part or motors. Thus in some instances it may be the end position of the command being processed while in the instant embodiment, if it is considered that motor movement is being directed by a first command, the next command is stored in the buffer storages 12 and 13 and the new position register has the third command, the count of the present position register information would be the destination of the movement stored in the buffer storage.

While the new position register is shown as being cleared when a movement complete signal is received, it will be understood that with some registers a clearing signal is not needed and the registers will automatically clear themselves as they assume the new information.

While the transfer of information between the new position register and the present position register is shown as occurring sequentially, it will be understood that such a transfer may be effected any time prior to the new position registers assuming the next command, as for example, by using the movement complete signal A.

It will thus be understood that there has been disclosed an absolute numerical control system which accepts information in absolute form and processes the information into incremental form for use in an incremental numerical control system. The conversion from absolute information to incremental data is achieved by the use of two registers for each piece of data required in a command with one register being made to assume the information representing the new absolute position while the prior absolute position information which the one register had is shifted to a present position register. By the use of a time shared calculator the differences between the two registers both as to numerical count and direction is transfered to the storage for the incremental data in the incremental numerical control system. Thus, the system is rendered quite fast acting by being independent of the completion of each movement for performing the calculation so that one or more calculations may be effected with sufficient rapidity that a single calculator may not only be time shared between two or more pairs of registers but also permits input data to be received in the time remaining before a movement is completed.

Variations and modifications may be made within the scope of the claims and portions of the improvements may be used without others.

I claim:

1. An absolute numerical control system for producing movement from absolute information comprising an incremental numerical control system having means for producing movement and means for receiving information of the extent of an incremental movement from a last position to a present position, a new position register means for accepting and storing information in absolute form for a new position, a present position register means for storing information in absolute form of a present position, means for comparing the information in the two registers and providing the difference therebetween to the receiving means and means for shifting the information in the new position register means to the present position register means.

2. The invention as defined in claim 1 in which there are means for providing the next new position information in absolute form to the new position register means upon receipt of a signal and in which the incremental numerical control system includes means for providing the signal when it has completed a prior commanded movement.

3. The invention as defined in claim 1 in which the new position register means includes means for clearing information of the prior movement to enable it to accept and store the next position absolute information.

4. The invention as defined in claim 1 in which the absolute system produces movement on another direction, the incremental system includes a second means for producing movement and second means for storing the extent of an incremental movement from a last position to a present position in the another direction, a second new position register means, a second present position register means, second means for transferring the information from the second new position register means to the second present register means and means for interconnecting the means for comparing to the second new register means and the second present position register means and the second means for storing for providing the difference therebetween to the second means for storing after completion of providing the difference to the first mentioned means for storing.

5. The invention as defined in claim 1 in which the information for a movement includes a plurality of pieces of absolute information, in which there is a pair of position registers for each piece of information and in which the information in one register is shifted to the other register of a pair for each commanded movement.

6. The invention as defined in claim 5 in which there are means for individually and sequentially interconnecting the means for comparing with each pair of registers.

* * * * *